April 25, 1939.　　F. G. LEAVENWORTH ET AL　　2,155,865
APPARATUS FOR INDICATING THE AMOUNT OF PRESSURE
IN PNEUMATIC TIRES FOR AUTOMOBILES
Filed Oct. 22, 1934　　　3 Sheets-Sheet 1
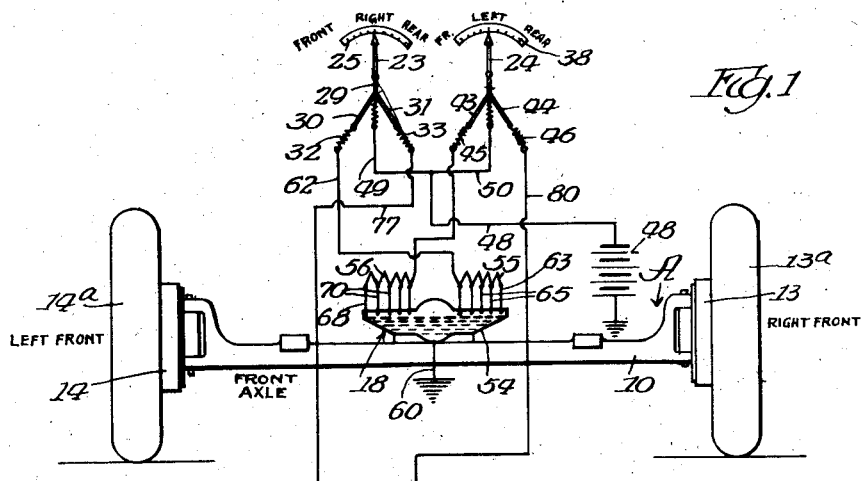
Fig.1
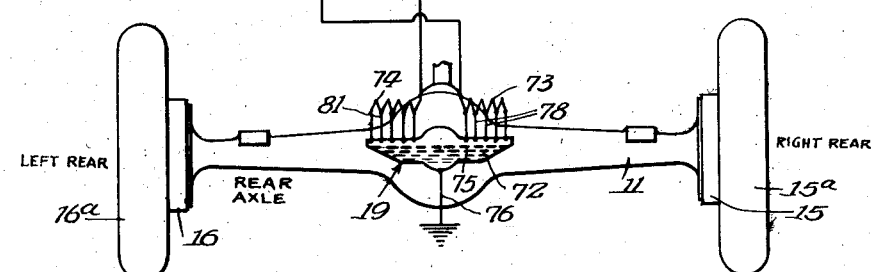
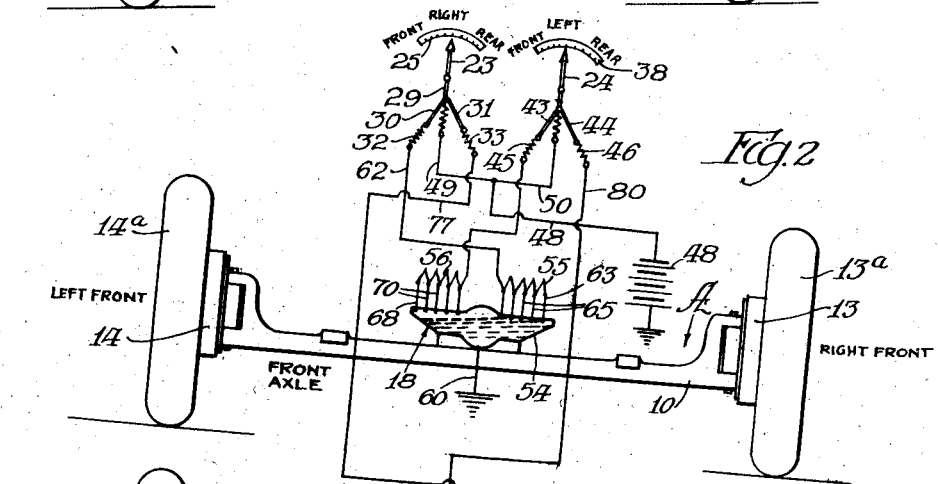
Fig.2
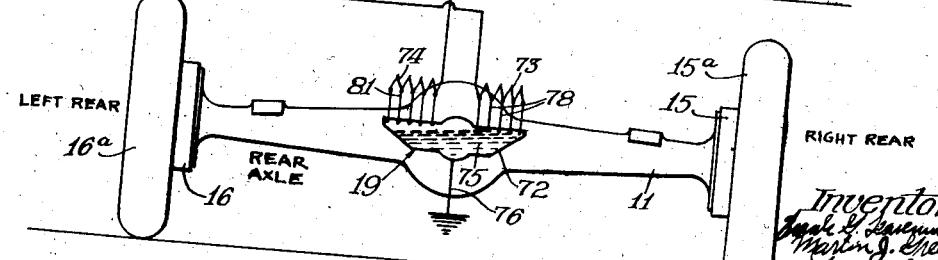

April 25, 1939.     F. G. LEAVENWORTH ET AL     2,155,865
APPARATUS FOR INDICATING THE AMOUNT OF PRESSURE
IN PNEUMATIC TIRES FOR AUTOMOBILES
Filed Oct. 22, 1934     3 Sheets-Sheet 2
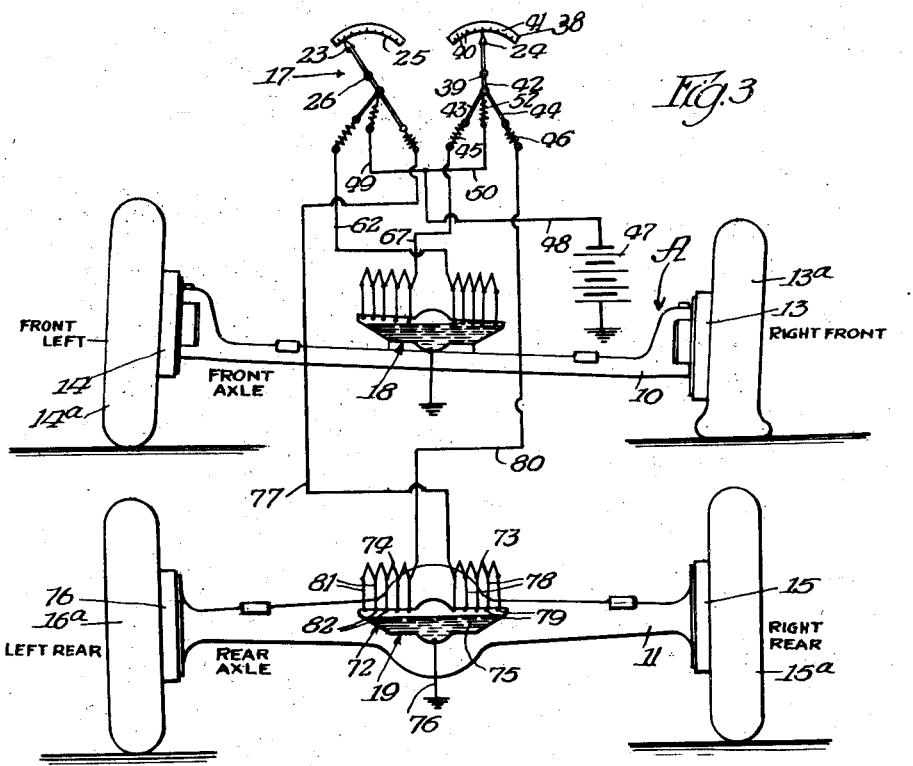
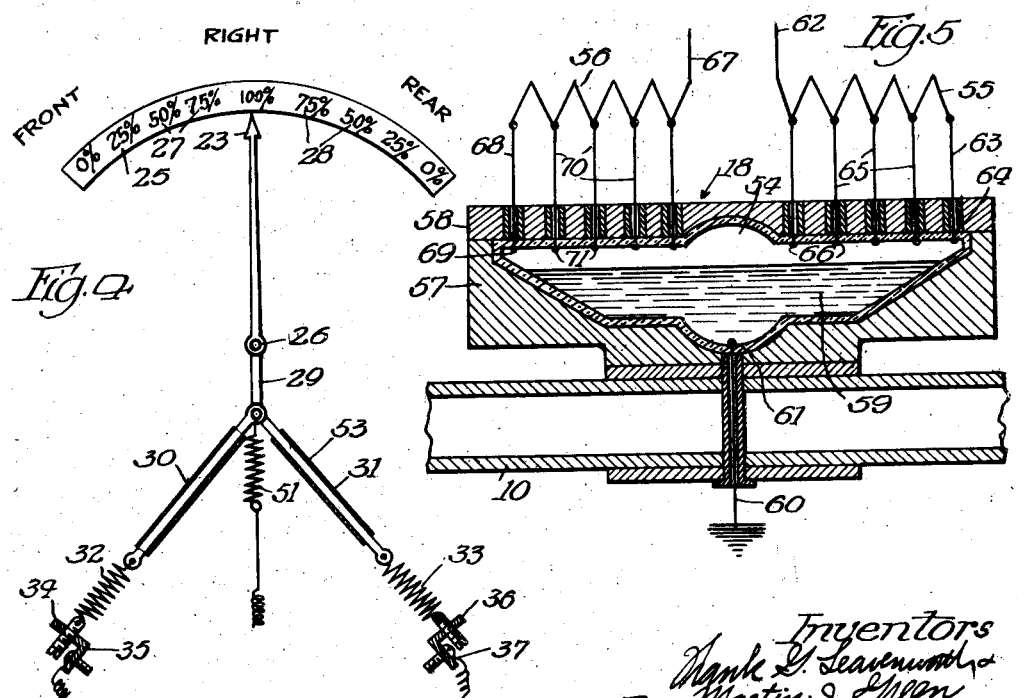

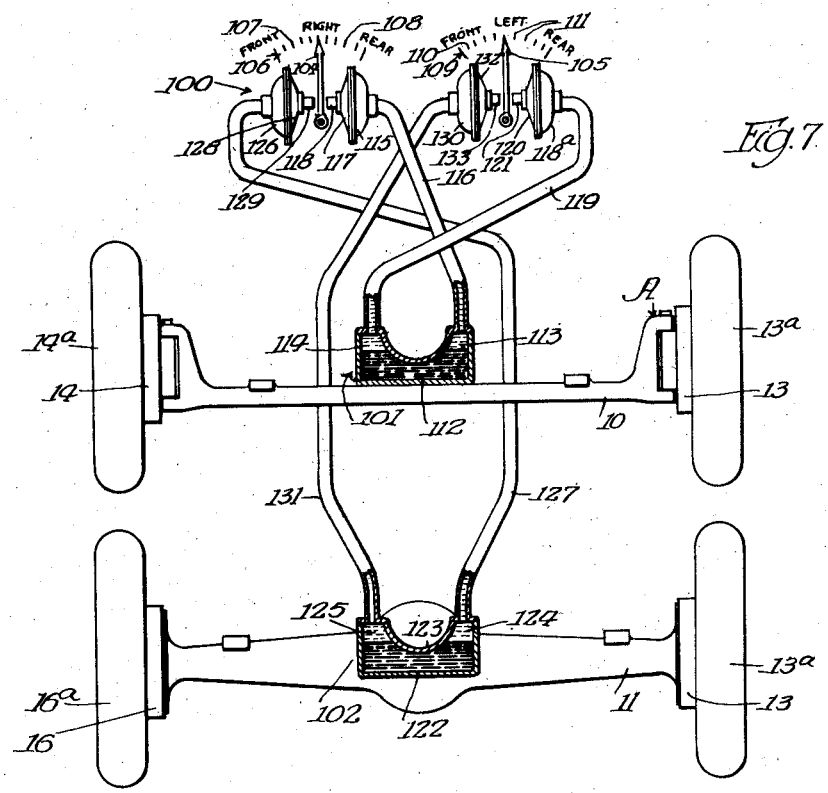

Patented Apr. 25, 1939

2,155,865

UNITED STATES PATENT OFFICE 2,155,865

APPARATUS FOR INDICATING THE AMOUNT OF PRESSURE IN PNEUMATIC TIRES FOR AUTOMOBILES

Frank G. Leavenworth, Oak Park, and Martin J. Green, Chicago, Ill., assignors to William Hartman, Chicago, Ill., trustee Application October 22, 1934, Serial No. 749,364

19 Claims. (Cl. 177—351)

The invention relates to apparatus for indicating the amount of pressure in pneumatic tires, and one object thereof is to provide an apparatus of this character which is adapted to be installed on an automobile and includes an indicator on the dashboard having means for indicating the amount of pressure of the front and rear tires of the automobile.

Another object of the invention is to provide an apparatus of the type under consideration in which the indicator on the dashboard of the automobile is controlled for pressure indicating purposes by means of a pair of devices which are mounted one on the central portion of the front axle of the automobile and the other on the central portion of the rear axle, and operate in response to any inclination of the axles due to tire deflation.

A further object of the invention is to provide a pressure indicating apparatus of the last mentioned character in which the indicator controlling devices on the axles are so arranged and connected with respect to the indicator that the indicating means of the latter will not give a false reading as far as the amount of tire pressure is concerned when the automobile is tilted sidewise as the result of being driven or parked on a laterally sloping roadway or other surface.

A still further object of the invention is to provide an apparatus of the type and character under consideration which is generally of novel construction, may be manufactured and installed at a comparatively low cost and serves efficiently and accurately to indicate to the driver or occupants of the automobile to which the apparatus is applied the amount of pressure in each of the four tires of the automobile.

Other objects of the invention and the various advantages and characteristics of the present pressure indicating apparatus will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a diagrammatic view showing a pressure indicating apparatus embodying the invention in its assembled position with respect to an automobile and illustrating the position of the indicating means of the dashboard indicator when the tires of the automobile are properly or fully inflated and the axles of the automobile are horizontally disposed;

Figure 2 is a diagrammatic view showing the position of the indicating means of the indicator when the axles of the automobile are tilted sidewise in one direction as the result of the automobile being driven or parked on a laterally sloping roadway or surface;

Figure 3 is a diagrammatic view illustrating the manner in which the indicating means of the indicator shows tire deflation when any of the four tires of the automobile have less than normal air pressure therein;

Figure 4 is a detail view of the indicating means or part of the indicator which serves to show the amount of pressure in the right front and right rear tires of the automobile to which the apparatus is applied;

Figure 5 is a sectional view of one of the axle supported devices for controlling the indicator;

Figure 6 is a detail sectional view of the indicator; and

Figure 7 is a diagrammatic view of an apparatus embodying a modified or alternative form of the invention.

The apparatus which constitutes the preferred form of the invention and is shown in Figures 1 to 6 inclusive of the drawings, is adapted and designed for use in connection with an automobile A and serves to indicate the amount of air pressure in the tires of the automobile. The automobile A is shown diagrammatically in Figures 1, 2 and 3 and is supposedly of conventional or standard design and construction in that it includes a front axle 10, a rear axle 11, and a dashboard 12. The front axle is connected by springs (not shown) to the chassis of the automobile as well understood in the art, and includes a right hand dirigible wheel 13 with a pneumatic tire 13a, and a left hand dirigible wheel 14 with a pneumatic tire 14a. The rear axle 11 is located behind the front axle and has a right hand traction wheel 15 with a pneumatic tire 15a, and a left hand traction wheel 16 with a pneumatic tire 16a. The dashboard 12 is supported on the chassis of the automobile in front of the usual seat for the driver or operator of the automobile. The pressure indicating apparatus of Figures 1 to 6 inclusive, is of the electrical type and comprises an indicator 17 and a pair of indicator controlling devices 18 and 19.

The indicator 17 comprises a casing 20 which is mounted in the dashboard 12 within the range of vision of the driver or operator of the automobile A and has a face plate 21 across the central portion thereof and a glass plate 22 across its front so that the face plate is visible to the driver. In addition to the casing 20 the indicator 17 comprises a pair of pointers 23 and 24. The pointer 23 is located between the plates 21 and 22 and coacts with an arcuate scale 25 on the face plate 21 to indicate the amount of pressure in the right front tire 13a and the right rear tire 16a. A rock shaft 26 extends through the face plate 21 and supports the pointer 23 so that it is free to swing back and forth relatively to the scale 25. As shown in Figure 4 the scale 25 has graduations or markings 27 on the left hand side to indicate the amount of pressure in the right front tire 13a of the automobile and has graduations or markings 28 on its right hand side to indicate the amount of pressure in the right rear tire 15a. The pointer 23, when in a vertical position, points to the central portion of the scale 25 and indicates that both the right front and right rear tires are normally or properly inflated. When the pointer swings to the left hand side of the scale it indicates a decrease in pressure in the front right tire, and when it swings to the right hand side of the scale 23 it indicates a decrease in pressure in the right rear tire 15a. The graduations or markings 27 and 28 are preferably in the form of percentages of tire inflation so that the driver of the automobile may, by noting the position of the pointer 23 with respect to the scale 25, determine the percentage of pressure in either the right front or right rear tire as computed from normal or proper pressure. The shaft 26 is rocked for pointer swinging purposes by means of an arm 29 and a pair of fine wires 30 and 31. The arm 29 is disposed in the rear portion of the casing 20 of the indicator and is fixed to and extends radially from the shaft 26 as shown in Figure 4. The wire 30 extends downwardly and outwardly in one direction and has one end thereof connected to the distal end of the arm 29 and its other end connected to a tension spring 32. The wire 31 extends downwardly and outwardly in the opposite direction and is connected at its upper end to the distal end of the arm 29. The lower end of the wire 31 is connected to the tension spring 33 and this spring together with the spring 32 operates through the medium of the wires 30 and 31 and the arm 29 to hold the pointer in its vertical position. The tension spring 32 is anchored to an adjusting screw 34 in a bracket 35 in one portion of the indicator casing 20. The lower end of the tension spring 33 is attached to an adjusting screw 36 in an angle bracket 37 in another portion of the casing 20 of the indicator. By adjusting the screws 34 and 36 the tension of the springs 32 and 33 may be regulated so that normally the pointer is held in its vertical position. The wires 30 and 31 are formed of Nichrome or like material and are adapted as hereinafter described to have current passed through them for pointer shifting purposes. When current is passed through the wire 30 the wire due to its fineness becomes heated and lengthens. This in conjunction with the action of the tension springs 32 and 33 causes the pointer 23 to swing toward the left hand side of the scale 25. When current is passed through the wire 31 the latter, as in the case of the wire 30, becomes heated and lengthens and causes the pointer 23 to swing to the right hand side of the scale 25.

The pointer 24 is located adjacent to the pointer 23 in the casing 20. It is disposed between the face plate 21 and the glass plate 22 of the casing and coacts with an arcuate scale 38 on the face plate 21 to indicate the amount of pressure in the left front and left rear tires 14a and 16a of the automobile A. A rock shaft 39 like the rock shaft 26 for the pointer 23, serves to support the pointer 24 so it is free to swing back and forth relatively to the scale 38. The left hand side of the scale has graduations or markings 40 for indicating the amount of pressure in the left front tire 14a and the right hand side of the scale 38 has graduations or markings 41 for indicating the amount of pressure in the left rear tire 16a. The pointer when in a vertical position points to the central portion of the scale 38, and indicates that both the left front and left rear tires are under normal or proper air pressure. Rocking of the shaft 39 for pointer swinging purposes is effected by means of an arm 42 and a pair of fine Nichrome wires 43 and 44. The arm 42 is fixed to and extends radially from the shaft 39 and is located in the rear portion of the indicator casing 20. The Nichrome wires 43 and 44 are connected to the distal end of the arm 42 and extend downwardly and outwardly in opposite directions. A tension spring 45 and a tension spring 46 are applied to the lower ends of the wires 43 and 44 respectively and operate normally to hold the pointer 24 in its vertical position. When current is supplied to either the wire 43 or the wire 44, as hereinafter described, the wire heats and as a result of the lengthening thereof causes a deflection of the pointer 24 with respect to the scale 40. The arms 29 and 42 are formed of insulating material. Current is supplied to the wires 30 and 31 for the pointer 23 and the wires 43 and 44 for the pointer 24 from a battery 47 which if desirable may be the regular storage battery of the automobile A. A conductor 48 leads from one side of the battery 47 to a pair of branch conductors 49 and 50. The branch conductor 49 is connected by a flexible wire 51 to the upper ends of the wires 30 and 31 and the conductor 50 is connected by a flexible wire 52 to the upper ends of the Nichrome wires 43 and 44. The flexible wires 51 and 52 are provided for the purpose of permitting the pointers 23 and 24 to swing freely. The wires 30 and 31 are preferably covered with tubular strips 53 of asbestos, and the brackets 35 and 37 are suitably insulated from the casing 20 of the indicator. The Nichrome wires 43 and 44 for the pointer 24 are also covered with tubular strips of asbestos or like material and the springs 45 and 46 therefor are connected to adjusting screws (not shown) similarly to the tension springs 32 and 33 for the wires 30 and 31. The supply of current to the Nichrome wires 30, 31, 43 and 44 is controlled by means of the controlling devices 18 and 19.

The controlling device 18 is associated with the front axle 10 of the automobile and comprises a tube 54 and a pair of resistance elements 55 and 56. The tube 54 is formed of glass or any other suitable material and is mounted in a housing 57 on the central portion of the axle 10. This housing 57 is shaped so as to hold the tube 54 in parallel relation with respect to the axle 10 and has a removable cover 58 for holding the tube in place in it. The tube 54 is filled approximately half-way with mercury 59 and has closed ends. A wire 60 leads downwardly from a contact 61 in the bottom of the tube and is grounded in any suitable manner. The resistance element 55 is located on top of the cover 58 and extends parallel with and over the end of the tube which faces in the direction of the right front wheel 13 of the automobile. A conductor 62 extends between the inner end of the resistance elements 55 and the bracket 35 for the adjusting screw 34, and a wire 63 extends between the outer end of the resistance element 55 and a contact 64 in the extreme outer end of the mercury charged tube 54. When the axle of the automobile tilts downwardly in the direction of the wheel 13 as the result of deflation of the tire 13a, the mercury in the tube 54 flows to the right hand end of the tube as shown in Figure 3 and establishes the following electrical circuit, battery 47, conductor 48, branch conductor 49, flexible wire 51, Nichrome wire 30, spring 32, adjusting screw 34, bracket 35, conductor 62, resistance element 55, wire 63, mercury 59, and ground wire 60. When this circuit is established the Nichrome wire 30 due to the flow of current therethrough becomes heated as previously pointed out, and due to the increase in the length thereof as the result of its increase in temperature causes the pointer 23 to swing to the left hand side of the scale 25 and to indicate by way of the graduations or markings 27 the deflated condition of the right front tire of the automobile. By reason of the fact that the resistance element 55 is included in the circuit there is but a comparatively small amount of current passing through the Nichrome wire 30 with the result that the deflection of the pointer 33 is comparatively small. In order to increase the deflection of the pointer as the downward tilting or inclination of the axle 10 increases as the result of further or increased deflation of the tire 13a a group of wires 65 is provided. These wires, as shown in Figure 5 of the drawings, leads from different portions of the resistance element 55 to contacts 66 in the upper right hand end of the tube 54. The contacts 66 are arranged in longitudinal series and are adapted successively to be immersed in the mercury during downward tilting of the axle as indicated in Figure 3. As a result of this arrangement the resistance element 55 is included in the aforementioned circuit in decreasing amounts as the inclination or tilt of the tube 54 increases. As the resistance element is progressively cut out the current through the Nichrome wire 30 increases with the result that this wire progressively increases in length and causes a progressive deflection of the pointer 23 with respect to the graduations or markings 27. These graduations are preferably made so that the pointer will indicate a 0% of air in the tire 13a when the pointer is shifted to the extreme left hand side of the scale 23 and the tilting of the tube is such that the resistance element 55 is completely cut out of the circuit. As the result of the arrangement of the wires 65 the degree of tilting of the tube 54 determines the degree of deflection of the pointer 23 with respect to the graduations or markings 27. When the right front tire 13a is fully inflated and the tube 54 is in a horizontal position the mercury 59 is out of contact with the contacts 64 and 66, as shown in Figure 5, with the result that no current flows through the Nichrome wire 30 and the pointer 23 remains in its normal vertical position. Because the lengthening of the Nichrome wire 30 is not instantaneous when current passes therethrough the pointer 23 is not deflected when the wheel 13 encounters a depression or hole in the roadway and the mercury 59 momentarily is brought into engagement or contact with the contacts 64 and 66.

The resistance element 56 is located over and extends parallel with the end of the tube 54 which projects in the direction of the left front wheel 14 of the automobile. The inner end of this resistance element is connected by a conductor 67 to the spring 45 at the lower end of the Nichrome wire 43, and a wire 68 is connected to the outer end of the resistance element 56 and leads to a contact 69 in the upper portion of the extreme left hand end of the mercury charged tube 54. When the axle 10 tilts downwardly in the direction of the left front wheel 14 as the result of deflation of the tire 14a, the tube 54 tilts correspondingly and the following electrical circuit is established as the result of the mercury 59 contacting with the contact 69: battery 47, conductor 48, branch conductor 50, Nichrome wire 43, tension spring 45, conductor 67, resistance element 56, wire 68, mercury 59, and ground wire 60. When this circuit is established the Nichrome wire 43 becomes heated, and as the result of the lengthening thereof causes a deflection of the pointer 24 toward the graduations or markings 40 on the scale 38. In order proportionally or correspondingly to increase the deflection of the pointer 24 as the degree of tilt or inclination of the axle 10 increases as the result of further deflation of the left front tire 14a, wires 70 are provided. These wires, as shown in Figure 5, extend between different portions of the resistance elements 56 and a longitudinal series of contacts 71 along the upper portion of the left hand end of the tube 54. The wires 70 form connections between the tube and the resistance element 56 whereby the resistance element is progressively cut out as the downward tilting of the tube in the direction of the left front wheel 14 increases. The graduations or markings 40 on the scale 38 are so arranged that the pointer 24 indicates a 0% of air pressure in the tire 14a when the latter is fully deflated and the mercury in the tube 54 as the result of maximum tilting of the axle 10 contacts with the innermost contact 71. When the axle 10 is horizontal as the result of full or normal inflation of the tire 14a, the mercury 59 does not contact with the contacts 69 and 71 and as the result no current passes through the Nichrome wire 43. The controlling device 19 is associated with the rear axle 11 of the vehicle and is similar in construction and design to the controlling device 18. It is located on the central portion of the axle 11 and comprises a suitably housed glass tube 72, a resistance element 73, and a resistance element 74. The tube 72 is filled approximately half-way with mercury 75, and has a ground wire 76 for the mercury. The resistance element 73 is located over and extends parallel with the end of the tube 75 which faces in the direction of the right rear wheel 15. It is connected by a conductor 77 to the bracket 37 for the adjusting screw 36 and has wires 78 between different portions thereof and contacts 79 in the upper portion of the right hand end of the tube 72. The wires 78 and the contacts 79 are the same in arrangement as the wires between the resistance element 55 and the contacts 64 and 63. When the axle 11 tilts downwardly in the direction of the right rear wheel 15 as the result of deflation of the tire 15a the mercury 75 in the tube 72 flows into contact with the contacts 79 and establishes the following electrical circuit, battery 47, conductor 48, branch conductor 49, Nichrome wire 31, tension spring 33, adjusting screw 36, bracket 37, conductor 77, resistance element 73, mercury 75, and ground wire 76. When this circuit is established so that current passes through the Nichrome wire 31 the latter becomes heated and as as the result of lengthening thereof deflects the pointer 23 toward the graduations or markings 28 on the scale 25 and thus discloses deflation of the right rear tire 15a to the driver or operator of the automobile. The wires and contacts 78, 79 are so arranged that the resistance element 73 is progressively cut out of the circuit as the tilting of the axle 11 in the direction of the wheel 15 increases. Because of this the deflection of the pointer 23 toward the graduations or markings 28 increases as the deflation of the tire 15a increases. When the automobile A is driven over a roadway which slopes laterally in the direction of the right front and rear wheels 13 and 15 as indicated in Figure 2 of the drawings, there is no deflection of the pointer 23 in either direction due to the fact that although circuits are established through the wires 30 and 31 the wires heat and lengthen uniformly. This feature is of importance as far as the apparatus is concerned inasmuch as there is no false reading of the indicator when the automobile is driven on a laterally inclined roadway. The resistance element 74 overlies and extends parallel with the end of the tube 72 which faces or extends in the direction of the right rear wheel 16. It is connected at its inner end to the tension spring 46 for the Nichrome wire 44 by a conductor 80 and has wires 81 which lead from different portions of it to a longitudinal series of contacts 82 along the upper portion of the left hand end of the tube 72. When the axle 11 tilts downwardly in the direction of the wheel 16 as a result of deflation of the left rear tire 16a the tube 72 tilts correspondingly and the mercury 75 engages the contacts 82 to establish the following electrical circuit through the wire 44, battery 47, conductor 48, branch conductor 50, Nichrome wire 44, tension spring 46, conductor 80, resistance element 74, wires 81, mercury 75, and ground wire 76. Upon completion of this circuit the wire 31 as the result of current passing therethrough becomes hot and lengthens and causes the pointer 24 to swing toward the graduations or markings 41 so as to indicate deflation of the left rear tire 16a. Because of the arrangement of the contacts 82 the resistance element 74 is progressively cut out of the circuit as the tilting of the axle 11 increases toward the wheel 16. Because of this the flow of current through the Nichrome wire 44 is controlled so that the wire effects increased deflection of the pointer 24 with respect to the graduations 41 as deflation of the tire 16a increases. If the automobile A is driven over a roadway which slants in the direction of the left front and rear wheels 14 and 16 there is no deflection of the pointer 24 with respect to the graduations or markings 40 and 41 inasmuch as current is caused to pass through both Nichrome wires 43 and 44 and the two wires lengthen uniformly.

The operation of the apparatus of Figures 1 to 6 inclusive is as follows: When all four tires of the automobile are fully inflated, as shown in Figure 1, the axles 10 and 11 are horizontally disposed and there is no contact between the mercury in the tubes 54 and 72 and the contacts for the resistance elements 55, 56, 73 and 74. Because of this no current flows through the Nichrome wires 30, 31, 43 and 44 and the pointers 23 and 24 are held in a vertical position with respect to the scales 25 and 38 and indicate full inflation of the tire. In the event of puncture or deflation of any of the tires of the automobile such for example as the right front tire 13a the axle 10 tilts downwardly in the direction of the wheel 13 and causes the tube 54 to tilt so that the mercury 59 is brought into contact with the contacts 64 and 66. As soon as the mercury is brought into contact with the contacts, current flows through the Nichrome wire 30 and causes the latter to lengthen as the result of heat and to deflect the pointer 23 towards the markings 27 and thus to indicate the deflated condition of the tire 13a on the scale 25. When the left front tire is punctured so that the axle 10 is tilted in the opposite direction the pointer 24 because of the passing of current through the Nichrome wire 43 swings toward the left hand side of the scale 38 and registers the deflated condition of the tire on the markings 40. In the event of deflation of the right rear tire 15a the pointer 23 swings to the right and indicates the condition of the tire on the graduations or markings 28 of the scale 25. Likewise when the left rear tire 16 is punctured or otherwise becomes deflated the condition of the tire is recorded or indicated by swinging of the pointer 24 toward the right hand end of the scale 38.

The apparatus of Figures 1 to 6 inclusive is comparatively simple as far as construction is concerned, and may be manufactured at a low and reasonable cost. It is extremely efficient in operation due to the fact that the controlling devices 18 and 19 are so arranged and connected with respect to the indicator 17 that the pointers 23 and 24 will not give a false reading as far as amount of tire pressure is concerned when the automobile is tilted sidewise as the result of being driven or parked on a laterally sloping road, or when the automobile is driven over a rough roadway and the axles are momentarily tilted as the result of the wheels encountering holes or other depressions.

The apparatus which is shown in Figure 7 of the drawings and which constitutes a modified or alternative form of the invention, comprises an indicator 100, and a pair of controlling devices 101 and 102. The indicator like the indicator 17 of the apparatus of Figures 1 to 6 inclusive of the drawings, is mounted in the dashboard of the automobile to which the apparatus is applied within the range of vision of the driver or operator of the automobile. It embodies a casing with a face plate 103 and includes a pointer 104 and a pointer 105. The pointer 104 is pivoted at one end thereof and coacts with an arcuate, graduated scale 106 on the face plate 103 to indicate the amount of pressure in the right front and right rear tires of the automobile. The scale has markings 107 on its left hand side in the form of percentages of inflations of the right front tire and embodies markings 108 on the right hand side thereof in the form of percentages of pressure or inflation of the right rear tire. The pointer 105 is pivoted at one end thereof similarly to the pointer 104 and coacts with an arcuate, graduated scale 109 on the face plate 103 to indicate the amount of pressure in the left front and rear tires of the automobile. The left hand side of the scale has markings 110 for the left front tire and the right hand side of the scale has markings 111 for the left rear tire. The controlling device 101 is secured on the central portion of the front axle of the vehicle and comprises a closed tube 112 of glass or like material. This tube is suitably mounted on the axle and has a baffle in the central portion thereof. This baffle extends downwardly to a point slightly above the bottom of the tube and forms a chamber 113 on one side thereof and a chamber 114 on its other side. The chamber 113 is positioned directly opposite the right front wheel of the vehicle and communicates with a hollow head 115 by way of a tube 116. The head is located in the casing of the indicator 100 and has a diaphragm 117 at one side thereof. This diaphragm is disposed opposite the pointer 104 and has a pad 118 which engages the central portion of the pointer and operates when the diaphragm is outwardly distended to swing the pointer toward the markings 107 on the left hand side of the scale 106. As shown in Figure 7 of the drawings the tube 112 is approximately one-half way filled with mercury. The head 115 as well as the tube 116 and the portion of the chamber 113 which is not filled with mercury is filled with oil or a like liquid. When the tube 112 is tilted downwardly as the result of deflation of the front right tire of the automobile, the mercury in the tube flows into the chamber 113 and forces the oil in the chamber upwardly through the tube 116 into the head 115. As a result of inflow of oil in the head 115 the diaphragm 117 is outwardly distended so that the pointer 104 swings over toward the markings 107 and indicates the deflated condition of the right front tire of the automobile. The chamber 114 is located opposite the left front wheel of the automobile and communicates with a head 118a by way of a tube 119. The head is located adjacent the pointer 105 and has a diaphragm 120. The latter has a pad 121 which engages the central portion of the pointer 105 and serves to shift the pointer to the left hand side of the scale 109 when the diaphragm is distended. The head 118a and also the tube 119 and the portion of the chamber 114 which is not filled with mercury are filled with oil. When the tube 112 tilts toward the left front wheel of the automobile as the result of deflation of the left front tire the mercury in the tube surges over into the chamber 114 and forces the oil in the chamber through the tube 119 into the head 118a. The inflow of oil into the head causes the diaphragm 120 to expand with the result that the pointer 105 is swung in the direction of the markings 110 and indicates the degree of deflation of the left front tire of the automobile.

The controlling device 102 is mounted on the central portion of the rear axle of the automobile and consists of a tube 122. The latter is positioned in parallel relation with the axle and embodies a centrally downwardly extending baffle or cross-wall 123 which divides the tube into a pair of connected chambers 124 and 125. The chamber 124 is positioned opposite to the right rear wheel of the automobile and communicates with a head 126 by way of a tube 127. The head has a diaphragm 128 with a pad 129. The latter contacts with the central portion of the pointer 104 and operates when the diaphragm is distended to shift the pointer toward the right hand side of the scale 106. The tube 122 is filled approximately half way with mercury and the head 126 and also the tube 127 and the portion of the chamber 124 without mercury are filled with oil. When the tube 122 tilts to the right as the result of deflation of the right rear tire, the oil in the chamber 124, due to the surging of the mercury into the chamber flows upwardly through the tube 127 to the tube 126. As soon as the oil flows into the head the diaphragm 128 is distended and causes the pointer 104 to swing to the right hand side of the scale 106 and to indicate on the calibrations 108 the deflated condition of the right rear tire. The chamber 125 communicates with a head 130 by way of a tube 131. The head is located adjacent the pointer 105 and includes a diaphragm 132. This diaphragm has a pad 133 which bears against the central portion of the pointer 125 and operates when the diaphragm is distended to swing the pointer 105 to the right hand side of the scale 109. The head 130 and also the tube 131 and the upper portion of the chamber 125 are filled with oil so that the diaphragm is distended when the tube 122 tilts to the left, as the result of deflation of the left rear tire of the automobile. The operation of the apparatus of Figure 7 is the same as that of Figures 1 to 6 inclusive except that the pointers of the indicator are operated by fluid instead of electricity. In view of the manner in which the controlling devices 101 and 102 are arranged with respect to the pointers the pointers are not deflected in either direction when the automobile tilts sidewise as a result of being driven on a laterally inclined roadway. When the automobile is tilted to the right as a result of being on an inclined roadway the diaphragms 117 and 128 are simultaneously distended with the result that the outward force or pressure of one neutralizes that of the other and causes no deflection of the pointer 104. When any one of the four tires of the automobile such for example as the right front tire is punctured, and as a result causes the front axle to tilt downwardly in the direction of the right front wheel, the pointer 104 swings to the left as the result of the pressure developed in the head 115 and indicates on the markings, 107 the degree of deflation of the tire.

The invention is not to be understood as restricted to the details set forth, since these may be modified within the scope of the appended claims, without departing from the spirit and scope of the invention.

Having thus described the invention, what we claim as new and desire to secure by Letters Patent is:

1. The combination with a vehicle having wheels with pneumatic tires thereon, of a tire indicator mounted on the vehicle and having means for indicating the various degrees of deflation of the tires, and means for actuating said indicating means comprising a source of electric current, a plurality of circuits supplied with current from said source, and means controlled by tilting due to tire deflation for varying the flow of current through said circuits.

2. The combination with an automobile provided with a storage battery and having axles and wheels on the axles with pneumatic tires thereon, of a tire indicator mounted on the automobile and having means for indicating the various degrees of deflation of the tires, and means for actuating said indicating means comprising a plurality of circuits supplied with current from said storage battery, and means controlled by tilting of the axles due to tire deflation for varying the flow of current through the circuits.

3. The combination with an automobile having axles and wheels on the axles with pneumatic tires thereon, of a tire indicator mounted on the automobile and having means for indicating the various degrees of deflation of the tires, and means for actuating said indicating means including electric circuits with variable resistances therein and devices operative in response to tilting of the axles due to tire deflation to vary said resistances.

4. The combination with an automobile having axles and wheels on the axles with pneumatic tires thereon, of a tire indicator mounted on the automobile so that it may be viewed from the various degrees of deflation of the tires, and means for actuating said indicating means including electric circuits with variable resistances therein, and devices mounted adjacent to the central portions of the axles and operative in response to tilting of said axles due to tire deflation to vary the resistances.

5. The combination with an automobile provided with a storage battery and having axles and wheels on the axles with pneumatic tires thereon, of a tire indicator mounted on the automobile so that it may be viewed from the driver's seat and having means for indicating the various degrees of deflation of each tire, and means for actuating said indicating means comprising circuits corresponding in number to the wheels and supplied with current from said storage battery, variable resistances in the circuits, and devices mounted on the central portions of the axles and operative in response to tilting of said axles due to tire deflation to vary the resistances.

6. The combination with a vehicle having wheels with pneumatic tires thereon, of an indicator for registering the amount of pressure in the tires, mounted on the vehicle and comprising pointers and graduated scales, and means for actuating the indicator, controlled by tilting due to tire deflation and automatically operative progressively to move the pointers with respect to the scales as the angle of tilt increases.

7. The combination with an automobile having axles and wheels on the axles with pneumatic tires thereon, of an indicator for registering the amount of pressure in the tires, mounted on the automobile so that it may be viewed from the driver's seat and comprising pointers and graduated scales, and means for actuating the indicator, controlled by tilting of the axles due to tire deflation and automatically operative progressively to move the pointers with respect to the scales in response to progressive tilting of said axles.

8. The combination with an automobile having axles and wheels on the axles with pneumatic tires thereon, of an indicator for registering the amount of pressure in the tires mounted on the automobile and comprising movable pointers and graduated scales, and automatic means for progressively moving the pointers with respect to the scales in response to progressive deflation of the tires, including electric circuits and means controlled by tilting of the axles due to tire deflation for varying the flow of current through the circuits.

9. The combination with an automobile provided with a storage battery and having axles and wheels on the axles with pneumatic tires thereon, of an indicator for registering the amount of pressure in the tires, mounted on the automobile so that it may be viewed from the driver's seat and comprising pointers and graduated scales, and automatic means for progressively moving the pointers with respect to the scales in response to progressive deflation of the tires, embodying a plurality of electric circuits supplied with current from the storage battery, variable resistances in said circuits, and devices mounted on the central portions of the axles for varying the resistances in response to tilting of the axles due to tire deflation.

10. The combination with an automobile having a front and a rear axle and wheels with pneumatic tires at the ends of the axles, of a tire indicator mounted on the automobile so that it may be viewed from the driver's seat and comprising a graduated scale and a coacting pointer adapted when moved in one direction relatively to the scale to indicate the various degrees of deflation of the front tire at one side of the automobile, and adapted when moved in the other direction relatively to the scale to indicate the various degrees of deflation of the rear tire at said one side of the automobile; means for progressively moving the pointer in said one direction in response to progressive deflation of said front tire, comprising an electric circuit with a variable resistance therein, and a device controlled by tilting of the front axle relatively to the rear axle as the result of deflation of said front tire for varying the resistance; and means for progressively moving the pointer in said other direction in response to progressive deflation of said rear tire, comprising an electric circuit with a variable resistance therein, and a device controlled by tilting of the rear axle relatively to the front axle due to deflation of said rear tire for varying the last mentioned resistance.

11. The combination with an automobile having a front and a rear axle and wheels with pneumatic tires at the ends of the axles, of a tire indicator mounted on the automobile so that it may be viewed from the driver's seat and comprising a graduated scale and a coacting pointer adapted when moved in one direction relatively to the scale to indicate the various degrees of deflation of the front tire at one side of the automobile, and adapted when moved in the other direction relatively to the scale to indicate the various degrees of deflation of the rear tire at said one side of the automobile; means for progressively moving the pointer in said one direction in response to progressive deflation of said front tire, comprising an electric circuit with a variable resistance therein and an automatic resitance varying device mounted on the central portion of the front axle and controlled by tilting of the front axle relatively to the rear axle as the result of deflation of said front tire; and means for progressively moving the pointer in said other direction in response to progressive deflation of said rear tire, comprising an electric circuit with a variable resistance therein, and a device for automatically varying the last mentioned resitance, mounted on the central portion of the rear axle controlled by tilting of said rear axle relatively to the front axle as the result of deflation of said rear tire.

12. The combination with a vehicle having wheels with pneumatic tires thereon, of a tire indicator mounted on the vehicle and comprising movable members for indicating deflation of the tires and thermo-responsive elements adapted when heated to move said indicating members, and means for automatically heating the thermo-responsive elements upon deflation of the tires.

13. The combination with a vehicle having wheels with pneumatic tires thereon, of a tire indicator mounted on the vehicle and comprising a movable member adapted when moved in one direction to indicate deflation of one of the tires and when moved in the opposite direction to indicate deflation of another tire, a thermo-responsive element connected to the member and adapted when heated to move the member in said one direction, and a second thermo-responsive element connected to the member and adapted when heated to move the latter in said opposite direction; and an actuator for the indicator comprising means for automatically heating the first mentioned thermo-responsive element upon deflation of said one tire, and means for automatically heating said second thermo-responsive element upon deflation of said another tire.

14. In combination with an automobile having a front and a rear axle and wheels at ends of the axles with pneumatic tires thereon, of a tire indicator mounted on the vehicle and comprising a movable member adapted when moved in one direction to indicate deflation of the front tire at one side of the automobile and adapted when moved in the other direction to indicate deflation of the rear tire at said one side of the automobile, a thermo-responsive element connected to said member and adapted when heated to move the member in said one direction, and a second thermo-responsive element connected to the member and adapted when heated to move the member in said other direction; and an actuator for the indicator comprising means controlled by tilting of the front axle due to deflection of said front tire for automatically heating the first mentioned thermo-responsive element, and means controlled by tilting of the rear axle due to deflation of said rear tire for automatically heating said second thermo-responsive element.

15. The combination with an automobile having a front and a rear axle, and wheels with pneumatic tires, at the ends of the axles, of a tire indicator mounted on the automobile so that it may be viewed from the driver's seat and comprising a graduated scale, a coacting pointer adapted when moved in one direction relatively to the scale to indicate the various degrees of deflation of the front tire at one side of the automobile and adapted when moved in the other direction relatively to the scale to indicate the various degrees of deflation of the rear tire at said one side of the automobile, an element connected to the pointer and adapted when current is passed therethrough to distend and move the pointer in said one direction and a second element connected to the pointer in opposed relation with respect to the first mentioned element and adapted when current is passed therethrough to distend and move the pointer in said other direction; means for controlling the indicator so that the pointer is moved progressively in said one direction in response to progressive deflation of said front tire, comprising an electric circuit for said first mentioned element, a resistance in said circuit, and a control device operative in response to initial tilt of the front axle due to deflation of said front tire to close said circuit and further operative progressively to decrease the resistance in the circuit as tilting of said front axle increases due to progressive deflection of said front tire; and means for controlling the indicator so that the pointer is moved progressively in said other direction in response to progressive deflation of said rear tire, comprising an electric circuit for said second element, a resistance in said last mentioned circuit and a control device operative in response to initial tilt of the rear axle due to deflation of said rear tire to close said last mentioned circuit and further operative progressively to decrease the resistance in the latter circuit as tilting of said rear axle increases due to progressive deflation of said rear tire.

16. The combination with a vehicle having wheels with pneumatic tires thereon, of a tire indicator mounted on the vehicle and comprising movable members for indicating deflation of the tires; and hydraulic control means for the indicator whereby the members are automatically moved upon deflation of the tires.

17. The combination with a vehicle having a front and rear axle and wheels on the axles with pneumatic tires thereon, of a tire indicator mounted on the vehicle so that it is visible from the driver's seat and provided with means for indicating the various degrees of deflation of each tire, and means for automatically actuating said indicating means including an electric circuit for each means with a variable resistance therein, and a pair of control devices associated with the axles respectively and arranged and constructed so that they operate in response to progressive tilting of the axles in one direction due to deflation of the tires at one side of the vehicle to vary progressively the resistances in certain of the circuits and in response to progressive tilting of the axles in the other direction due to deflation of the tires at the other side of the vehicle to vary progressively the resistances in the other circuits.

18. The combination with a vehicle having a cross axle and wheels on the ends of the axle with pneumatic tires thereon, of a tire indicator mounted on the vehicle so that it is visible from the driver's seat and provided with means for indicating the various degrees of deflation of one of the tires and also provided with means for indicating the various degrees of deflation of the other tire, and means for automatically actuating the indicator comprising an electric circuit with a variable resistance therein for the first mentioned indicating means, an electrical circuit with a variable resistance therein for the second mentioned indicating means, and a control device associated with the axle and arranged so that in response to progressive tilting of the axle in one direction due to deflation of said one tire it progressively varies the resistance in said first mentioned circuit and also arranged so that in response to progressive tilting of the axle in the opposite direction due to deflation of said other tire it progressively varies the resistance in the second mentioned control circuit.

19. The combination with a vehicle having a cross axle and wheels on the ends of the axle with pneumatic tires thereon, of a tire indicator mounted on the vehicle so that it is visible from the driver's seat and provided with means for indicating the various degrees of deflation of one of the tires and also provided with means for indicating the various degrees of deflation of the other tire, and means for automatically actuating the indicator comprising an electrical circuit adapted to control the first mentioned indicating means and having a variable resistance therein mounted on the axle, an electrical circuit adapted to control the second mentioned indicating means and having a variable resistance therein mounted also on the axle, and an element mounted on the axle between the two resistances and so as to move lengthwise of the axle and arranged so that in response to progressive tilting of the axle in one direction due to deflation of said one tire it progressively varies the resistance in the first mentioned circuit and also arranged so that in response to progressive tilting of the axle in the opposite direction due to deflation of said other tire it progressively varies the resistance in the second mentioned circuit.

FRANK G. LEAVENWORTH.
MARTIN J. GREEN.